United States Patent
Iriyama et al.

(10) Patent No.: US 9,363,655 B2
(45) Date of Patent: Jun. 7, 2016

(54) DISTRIBUTION DEVICE, DISTRIBUTION METHOD, AND TERMINAL DEVICE

(71) Applicant: YAHOO JAPAN CORPORATION, Tokyo (JP)

(72) Inventors: Takamitsu Iriyama, Tokyo (JP); Koji Uno, Tokyo (JP); Masanori Hara, Tokyo (JP); Kiichi Fukatsu, Tokyo (JP)

(73) Assignee: YAHOO JAPAN CORPORATION, Tokyo (JP)

(*) Notice: Subject to any disclaimer, the term of this patent is extended or adjusted under 35 U.S.C. 154(b) by 139 days.

(21) Appl. No.: 14/047,383

(22) Filed: Oct. 7, 2013

(65) Prior Publication Data
US 2015/0094084 A1    Apr. 2, 2015

(30) Foreign Application Priority Data
Oct. 2, 2013 (JP) ................. 2013-207562

(51) Int. Cl.
| H04W 24/00 | (2009.01) |
| --- | --- |
| H04W 4/22 | (2009.01) |
| H04M 11/04 | (2006.01) |
| H04W 4/02 | (2009.01) |
| H04W 4/20 | (2009.01) |

(52) U.S. Cl.
CPC ............. *H04W 4/22* (2013.01); *H04W 4/028* (2013.01); *H04W 4/20* (2013.01)

(58) Field of Classification Search
CPC .................................................. H04W 64/00
USPC ....................................................... 455/456.1
See application file for complete search history.

(56) References Cited

U.S. PATENT DOCUMENTS 5,724,243 A * 3/1998 Westerlage et al. ........ 455/456.5
7,149,533 B2 * 12/2006 Laird et al. ................. 455/456.3

FOREIGN PATENT DOCUMENTS

| JP | A-2003-6793 | 1/2003 |
| --- | --- | --- |
| JP | 2004-101181 A | 4/2004 |
| JP | A-2007-265267 | 10/2007 |
| JP | 2013-101471 A | 5/2013 |

OTHER PUBLICATIONS

Mar. 3, 2015 Office Action issued in Japanese Application No. 2013-207562.
Nov. 17, 2015 Office Action issued in Japanese Patent Application No. 2013-207562.

* cited by examiner

*Primary Examiner* — Huy C Ho
(74) *Attorney, Agent, or Firm* — Oliff PLC (57) ABSTRACT

A distribution device according to the present application includes a receiving unit, a calculation unit, and a distribution unit. The receiving unit receives location information from a terminal device owned by a user. The calculation unit calculates, once the receiving unit receives the location information, an expected time within which the user arrives from a first coverage region in which communication is possible by way of an out-of-coverage region in which communication is impossible to a second coverage region. The distribution unit distributes an alert to a predetermined distribution destination if the location information of the second coverage region is not received from the terminal device within the expected time calculated by the calculation unit.

15 Claims, 7 Drawing Sheets

| SCHEDULED PATH | STARTING POINT | ENDING POINT | ... |
|---|---|---|---|
| $(X_S, Y_S) \rightarrow (X_1, Y_1) \rightarrow (X_2, Y_2) \rightarrow \cdots \rightarrow (X_G, Y_G)$ | $(X_{SP1}, Y_{SP1}), (X_{SP2}, Y_{SP2})$ | $(X_{EP1}, Y_{EP1}), (X_{EP2}, Y_{EP2})$ | ... |
| ... | ... | ... | ... |

| COVERAGE REGION ID | ... |
|---|---|
| A01 | ... |
| A03 | ... |
| A05 | ... |
| ... | ... |

| USER ID | SCHEDULED PATH | STARTING POINT | ENDING POINT | ... |
|---|---|---|---|---|
| U01 | $(X_S, Y_S) \rightarrow (X_1, Y_1) \rightarrow (X_2, Y_2) \rightarrow \cdots \rightarrow (X_G, Y_G)$ | $(X_{SP1}, Y_{SP1})$, $(X_{SP2}, Y_{SP2})$ | $(X_{EP1}, Y_{EP1})$, $(X_{EP2}, Y_{EP2})$ | ... |
| ... | ... | ... | ... | ... |

FIG.8

| USER ID | DISTRIBUTION DESTINATION | ... |
|---|---|---|
| U01 | xxx@yyy.com | ... |
| U02 | Twitter | ... |
| U03 | facebook | ... |
| ... | ... | ... |

FIG.10

DISTRIBUTION DEVICE, DISTRIBUTION METHOD, AND TERMINAL DEVICE

CROSS-REFERENCE TO RELATED APPLICATIONS

The present application claims priority to and incorporates by reference the entire contents of Japanese Patent Application No. 2013-207562 filed in Japan on Oct. 2, 2013.

BACKGROUND OF THE INVENTION

1. Field of the Invention

The present invention relates to a distribution device, a distribution method, and a terminal device.

2. Description of the Related Art

Known is a technique for confirming the safety of a user using a device that is communicable with a base station. For example, in such a technique, the safety of the user is confirmed by transmitting the present location from a cellular telephone terminal owned by the user to a predetermined destination.

Patent document 1: Japanese Patent Application Laid-open No. 2007-265267

Patent document 2: Japanese Patent Application Laid-open No. 2003-6793

However, according to the above-described related art, the safety of the user is not necessarily confirmed. Specifically, for example, in an area dotted with base stations, such as a mountainous area, there is a region outside a communication range, in which radio waves emitted from the base stations do not reach the cellular telephone terminal and communication is disabled. Therefore, there is a case in which the present location cannot be transmitted from the cellular telephone terminal to the predetermined destination. Accordingly, in the above-described related art, the safety of the user is not necessarily confirmed.

SUMMARY OF THE INVENTION

It is an object of the present invention to at least partially solve the problems in the conventional technology.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, modes (hereinafter, referred to as "embodiments") for implementing a distribution device, a distribution method, and a terminal device according to the present application will be described in detail with reference to the accompanying drawings. The embodiments do not limit the distribution device, the distribution method, and the terminal device according to the present application. The same reference numerals are attached to the same parts throughout the embodiments, and redundant description thereof is not repeated.

Embodiment

1. Distribution Process

Figure 1:
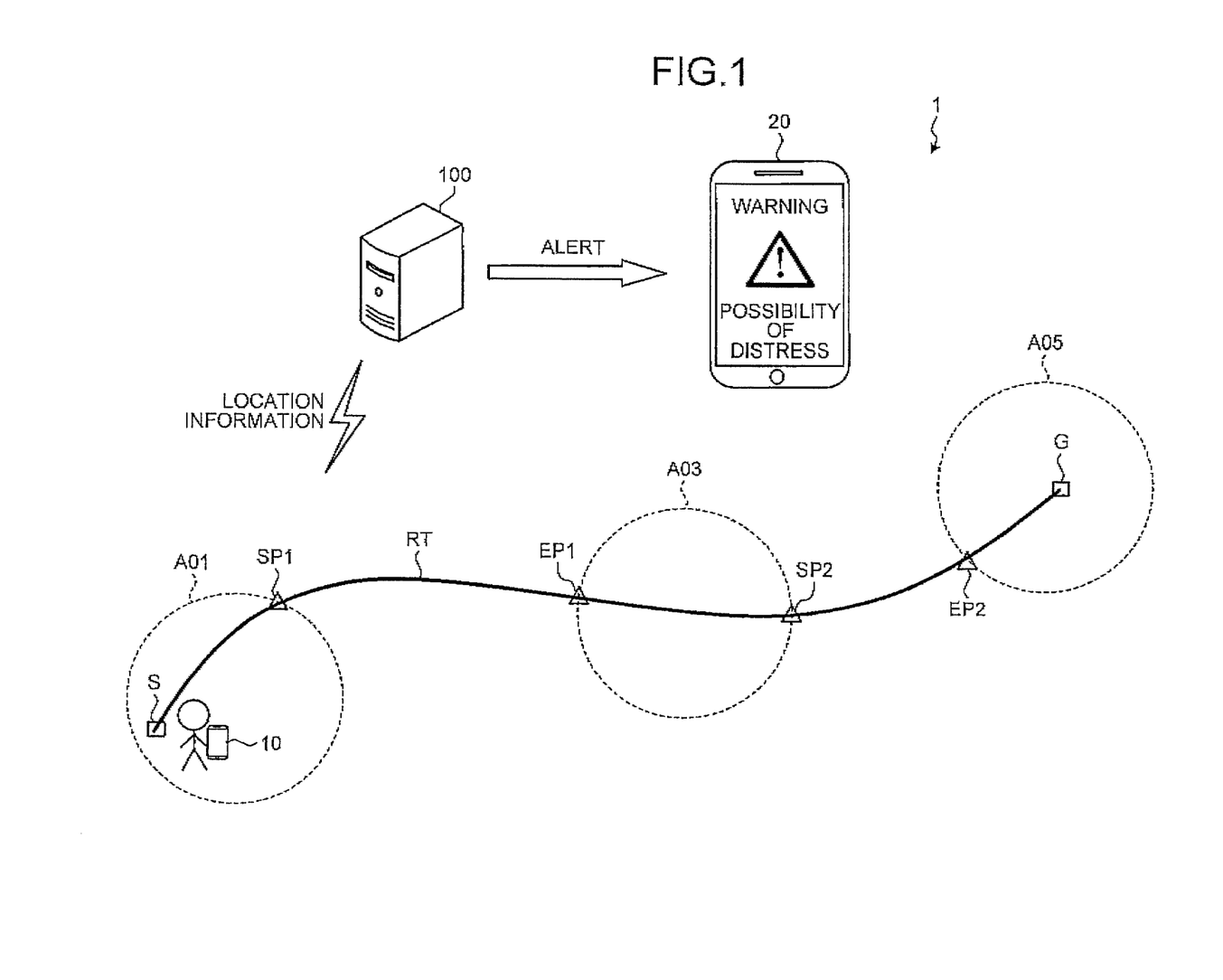
FIG. 1 is an explanatory diagram illustrating an example of a distribution process by a distribution device according to an embodiment of the present invention.

First, using FIG. 1, an example of a distribution process according to an embodiment will be described. FIG. 1 is an explanatory diagram illustrating an example of a distribution process by a distribution system 1 according to the embodiment. In the example of FIG. 1, the distribution process is performed to distribute an alert to a terminal device 20 by a distribution device 100.

The distribution process is described here for a case in which a user who owns a terminal device 10 is climbing a mountain. In the example of FIG. 1, the user is scheduled to arrive a scheduled path RT. The path starts from a start S in a coverage region A01 in which the terminal device 10 is communicable, and reaches a goal G by way of an out-of-coverage region in which the terminal device 10 is not communicable, a coverage region A03, and a coverage region A05.

First, the user operates the terminal device 10 before starting mountain-climbing to launch a transmission application that transmits location information to the distribution device 100 at a predetermined point. The terminal device 10 accepts setting of the scheduled path RT from the user. Then the terminal device 10 transmits the accepted scheduled path RT to the distribution device 100.

The distribution device 100 accepts the set scheduled path RT from the terminal device 10. The distribution device 100 extracts starting points SP1 and SP2 and ending points EP1 and EP2 from the accepted scheduled path RT. The starting point means a point at which a coverage region is switched to an out-of-coverage region along the scheduled path. The ending point means a point at which an out-of-coverage region is switched to a coverage region.

Specifically, as illustrated in FIG. 1, the distribution device 100 extracts the starting point SP1 at which the coverage region A01 is switched to the out-of-coverage region, and the starting point SP2 at which the coverage region A03 is switched to the out-of-coverage region. The distribution device 100 also extracts the ending point EP1 at which the out-of-coverage region is switched to the coverage region A03, and the ending point EP2 at which the out-of-coverage region is switched to the coverage region A05. Similarly to the distribution device 100, the terminal device 10 extracts the starting points SP1 and SP2 and the ending points EP1 and EP2 from the scheduled path RT.

The terminal device 10 and the distribution device 100 perform the processing described above before the user starts to climb the mountain. Then the terminal device 10 and the distribution device 100 perform the processing described below after the user starts to climb the mountain.

Upon arriving at the starting point SP1, the terminal device 10 transmits the location information of the starting point SP1, which is the present location, to the distribution device 100. Upon receiving the location information of the starting point SP1 from the terminal device 10, the distribution device 100 calculates an expected time needed for the user to arrive from the starting point SP1 to the ending point EP1, both indicated in the received location information. For example, the distribution device 100 calculates the expected time by dividing the distance between the starting point SP1 and the ending point EP1 by the walking speed of a general user.

After that, upon arriving at the ending point EP1, the terminal device 10 transmits the location information of the ending point EP1, which is the present location, to the distribution device 100. If the location information of the ending point EP1 is not received within the calculated expected time, the distribution device 100 distributes an alert indicating that the user has lost his/her way to the terminal device 20 that is a predetermined distribution destination registered in advance. Accordingly, information indicating that the user has lost his/her way is displayed on the terminal device 20.

Similarly, the terminal device 10 and the distribution device 100 repeatedly perform the processing described above until the user arrives at the goal G. Specifically, upon arriving at the starting point SP2, the terminal device 10 transmits the location information of the starting point SP2 to the distribution device 100. Upon receiving the location information of the starting point SP2 from the terminal device 10, the distribution device 100 calculates an expected time needed for the user to arrive from the starting point SP2 to the ending point EP2, both indicated in the received location information.

After that, upon arriving at the ending point EP2, the terminal device 10 transmits the location information of the ending point EP2 to the distribution device 100. If the location information of the ending point EP2 is not received within the calculated expected time, the distribution device 100 distributes the alert to the terminal device 20.

As described above, if the location information of an ending point is not received within an expected time, the distribution device 100 according to the embodiment distributes the alert to the terminal device 20, so that it is possible to find at an early stage that the user has lost his/her way. Accordingly, the owner of the terminal device 20 can confirm the safety of the user even when the terminal device 10 is in an out-of-coverage region.

2. Configuration of Distribution System

Figure 2:
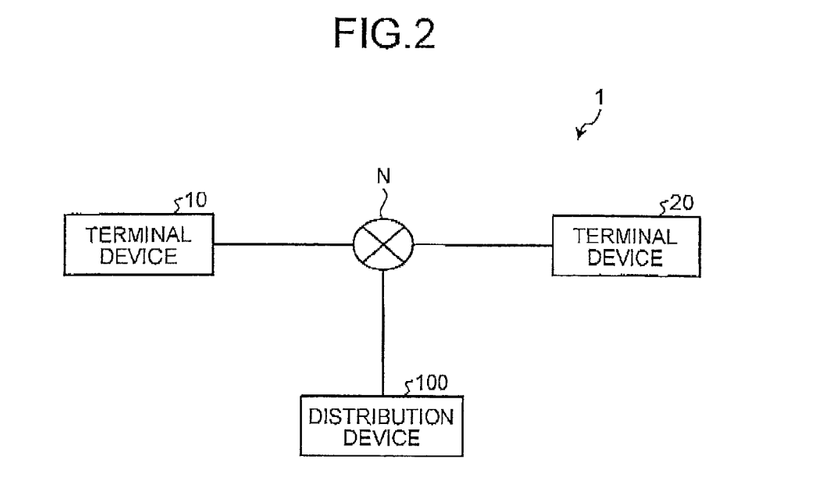
FIG. 2 illustrates a configuration example of a distribution system according to the embodiment.

Next, the distribution system 1 according to the embodiment will be described using FIG. 2. FIG. 2 illustrates a configuration example of the distribution system according to the embodiment. As illustrated in FIG. 2, the distribution system 1 includes the terminal device 10, the terminal device 20, and the distribution device 100. The terminal device 10, the terminal device 20, and the distribution device 100 are wirelessly connected to a network N so as to be communicable. FIG. 2 illustrates an example in which the distribution system 1 includes one terminal device 10, one terminal device 20, and one distribution device 100. However, the distribution system 1 may alternatively include a plurality of terminal devices 10, a plurality of terminal devices 20, and a plurality of distribution devices 100.

For example, the terminal device 10 is an information processing device such as a smart phone, a tablet device, a notebook personal computer (PC), a mobile phone, or a personal digital assistant (PDA). For example, the terminal device 10 transmits location information representing the present location of the terminal device 10 to the distribution device 100 by launching a transmission application that is an application for transmitting various pieces of information. Specifically, upon arriving at a starting point and an ending point, the terminal device 10 transmits location information indicating the present location to the distribution device 100. For example, the terminal device 10 is owned by a climber who climbs a mountain.

Similarly to the terminal device 10, the terminal device 20 is an information processing device such as a smart phone, a tablet device, a notebook PC, a mobile phone, or a PDA. For example, the terminal device 20 causes a display unit (for example, a liquid crystal display) to display an alert distributed from the distribution device 100. The terminal device 20 is a distribution destination registered in advance to which the alert is distributed from the distribution device 100. For example, the terminal device 20 is owned by his/her family who are close to the user owning the terminal device 10, or the police who search for the missing.

The distribution device 100 is a server device that distributes information about the safety of the user to the terminal device 20. Specifically, the distribution device 100 calculates an expected time within which the user arrives at an ending point based on location information transmitted from the terminal device 10, and distributes information about the safety of the user to the terminal device 20 if the location information of the ending point is not received within the calculated expected time.

3. Configuration of Terminal Device

Figure 3:
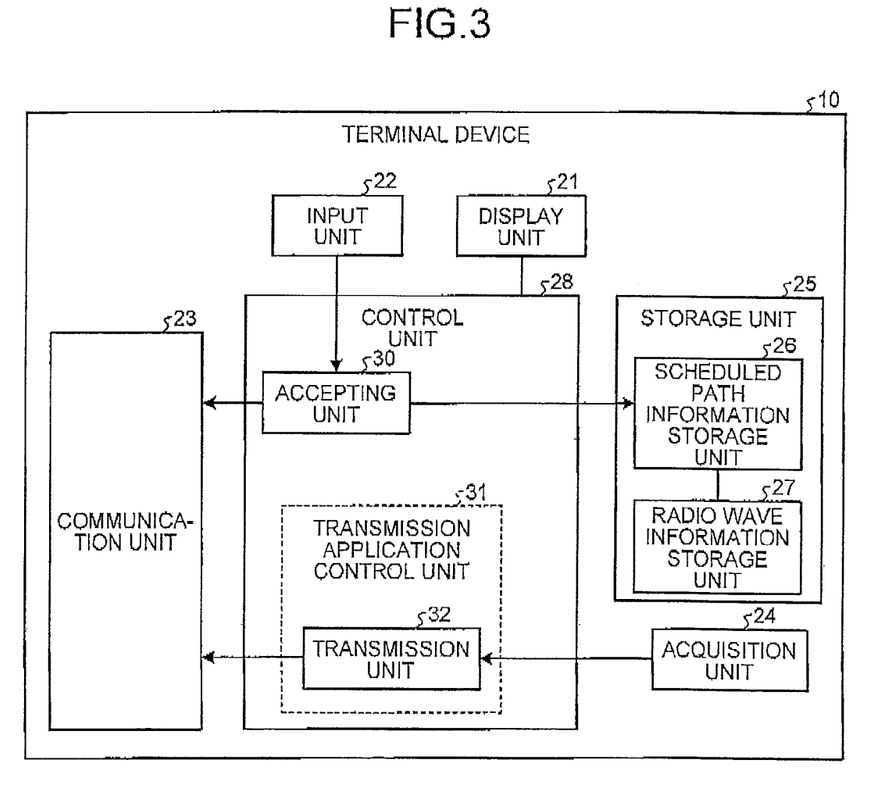
FIG. 3 illustrates a configuration example of a terminal device according to the embodiment.

Next, the configuration of the terminal device 10 according to the embodiment will be described using FIG. 3. FIG. 3 illustrates a configuration example of the terminal device 10 according to the embodiment. As illustrated in FIG. 3, the terminal device 10 includes a display unit 21, an input unit 22, a communication unit 23, an acquisition unit 24, a storage unit 25, and a control unit 28.

Display Unit 21 and Input Unit 22

The display unit 21 is a display device for displaying various pieces of information. For example, the display unit 21 is implemented with a liquid crystal display and the like. The input unit 22 is an input device that accepts various operations from the user. In a case in which a touch panel is employed for the terminal device 20 according to the embodiment, the display unit 21 and the input unit 22 are integrated.

Communication Unit 23

For example, the communication unit 23 is implemented with a network interface card (NIC) and the like. The communication unit 23 is connected to the network N in a wired or wireless manner, and transmits or receives information to/from the terminal device 20 and the distribution device 100 via the network N.

Acquisition Unit 24

The acquisition unit 24 is an acquisition device for acquiring the GPS coordinates of the present location. For example, the acquisition unit 24 is implemented with a GPS receiver and the like. Specifically, the acquisition unit 24 receives signals from GPS satellites, and calculates and acquires the GPS coordinates of the present location based on the received signals. For example, the acquisition unit 24 calculates the GPS coordinates of the present location using three-dimensional positioning.

Storage Unit 25

For example, the storage unit 25 is implemented with a semiconductor memory element such as a random access memory (RAM) or a flash memory, or a storage device such as a hard disk or an optical disk. The storage unit 25 includes a scheduled path information storage unit 26 and a radio wave information storage unit 27.

Scheduled Path Information Storage Unit 26

Figure 4:
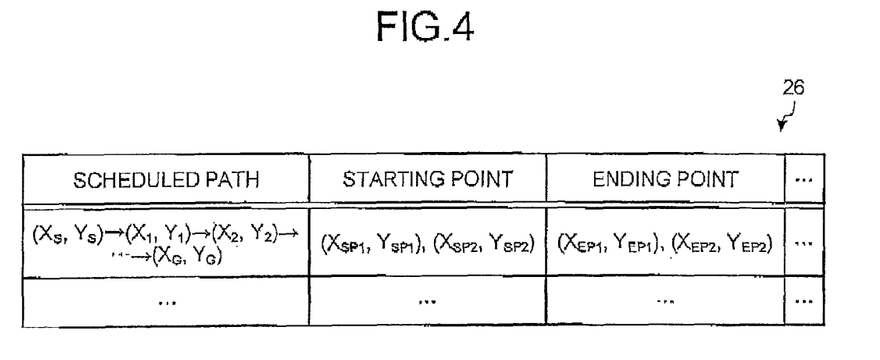
FIG. 4 illustrates an example of a scheduled path information storage unit according to the embodiment.

The scheduled path information storage unit 26 stores therein information about the scheduled path of the user. Specifically, the scheduled path information storage unit 26 stores therein the scheduled path accepted by an accepting unit 30, which will be described later. FIG. 4 illustrates an example of the scheduled path information storage unit 26 according to the embodiment. As illustrated in FIG. 4, the scheduled path information storage unit 26 includes items such as "scheduled path", "starting point", and "ending point".

The "scheduled path" indicates change in the GPS coordinates along the scheduled path through which the user passes. The "starting point" indicates the GPS coordinates at a point where a coverage region is switched to an out-of-coverage region. The "ending point" indicates the GPS coordinates at a point where an out-of-coverage region is switched to a coverage region. When the accepting unit 30 accepts the scheduled path, the "starting point" and the "ending point" are extracted based on information about the coverage region stored in the radio wave information storage unit 27, which will be described later. The "starting point" and the "ending point" may be manually set by the user via the input unit 22. Alternatively, the "starting point" and the "ending point" may be set by receiving a starting point and an ending point extracted by the distribution device 100.

FIG. 4 illustrates an example in which the scheduled path of the user starts from the GPS coordinates $(X_S, Y_S)$ and reaches the GPS coordinates $(X_G, Y_G)$ by way of the GPS coordinates $(X_1, Y_1)$ and $(X_2, Y_2)$ in this order. FIG. 4 illustrates an example of the scheduled path of the user in which the coordinates of the starting points are $(X_{SP1}, Y_{SP1})$ and $(X_{SP2}, Y_{SP2})$. FIG. 4 also illustrates an example of the scheduled path of the user identified by a user ID "U01" in which the coordinates of the ending points are $(X_{EP1}, Y_{EP1})$ and $(X_{EP2}, Y_{EP2})$.

Radio Wave Information Storage Unit 27

Figure 5:
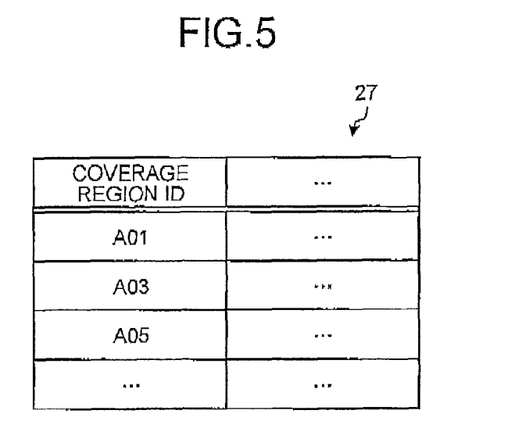
FIG. 5 illustrates an example of a radio wave information storage unit according to the embodiment.

The radio wave information storage unit 27 stores therein information about a region. For example, the radio wave information storage unit 27 stores therein a coverage region in which the terminal device 10 is communicable. FIG. 5 illustrates an example of the radio wave information storage unit 27 according to the embodiment. As illustrated in FIG. 5, the radio wave information storage unit 27 includes an item such as a "coverage region ID".

The "coverage region ID" indicates identification information for identifying a coverage region. FIG. 5 illustrates an example in which the terminal device 10 is communicable in regions identified by the coverage region IDs "A01", "A03", and "A05". The radio wave information storage unit 27 may store therein not only the region in which the terminal device 10 is communicable, but also information indicating the intensity of radio waves reaching such a region from a base station.

Control Unit 28

The control unit 28 is implemented by executing various computer programs stored in the storage device in the terminal device 10 using the RAM as a working area with a central processing unit (CPU), a micro processing unit (MPU), and the like. At the same time, the control unit 28 is implemented with an integrated circuit such as an application specific integrated circuit (ASIC), a field programmable gate array (FPGA), and the like.

As illustrated in FIG. 3, the control unit 28 includes the accepting unit 30 and a transmission application control unit 31. The control unit 28 includes, in addition to the transmission application control unit 31 illustrated in FIG. 3, application control units each of which controls execution of the corresponding application installed on the terminal device 10. For example, the control unit 28 may include an application control unit that controls execution of an application accessing a weather forecast site, and an application control unit that controls execution of an application accessing an auction site.

Accepting Unit 30

The accepting unit 30 accepts a scheduled path from the user. For example, the accepting unit 30 accepts GPS coordinates indicating a point through which the user is scheduled to pass from the user via the input unit 22. The scheduled path accepted by the accepting unit 30 is transmitted to the distribution device 100 via the communication unit 23. The execution of the accepting unit 30 may be implemented as a function of the transmission application control unit 31 described later and thereby controlled by a transmission application.

Transmission Application Control Unit 31

The transmission application control unit 31 controls the execution of the transmission application that transmits location information acquired by the acquisition unit 24 to the distribution device 100. The transmission application may be installed on the terminal device 10 in advance, or alternatively, may be installed on the terminal device 10 by being downloaded from a server device (for example, a server device that provides various applications) according to a user operation. As illustrated in FIG. 3, the transmission application control unit 31 includes a transmission unit 32, and implements or executes functions or effects of the information processing described below. The internal structure of the transmission application control unit 31 is not limited to the structure illustrated in FIG. 3, and may be another structure as long as it performs the information processing described later.

Transmission Unit 32

The transmission unit 32 transmits the location information acquired by the acquisition unit 24 to the distribution device 100. For example, when the terminal device 10 arrives at a starting point or an ending point, the transmission unit 32 transmits the location information of the present location to the distribution device 100. An example of the location information acquired by the acquisition unit 24 includes the GPS coordinates indicating the present location of the terminal device 10.

3. Configuration of Distribution Device

Figure 6:
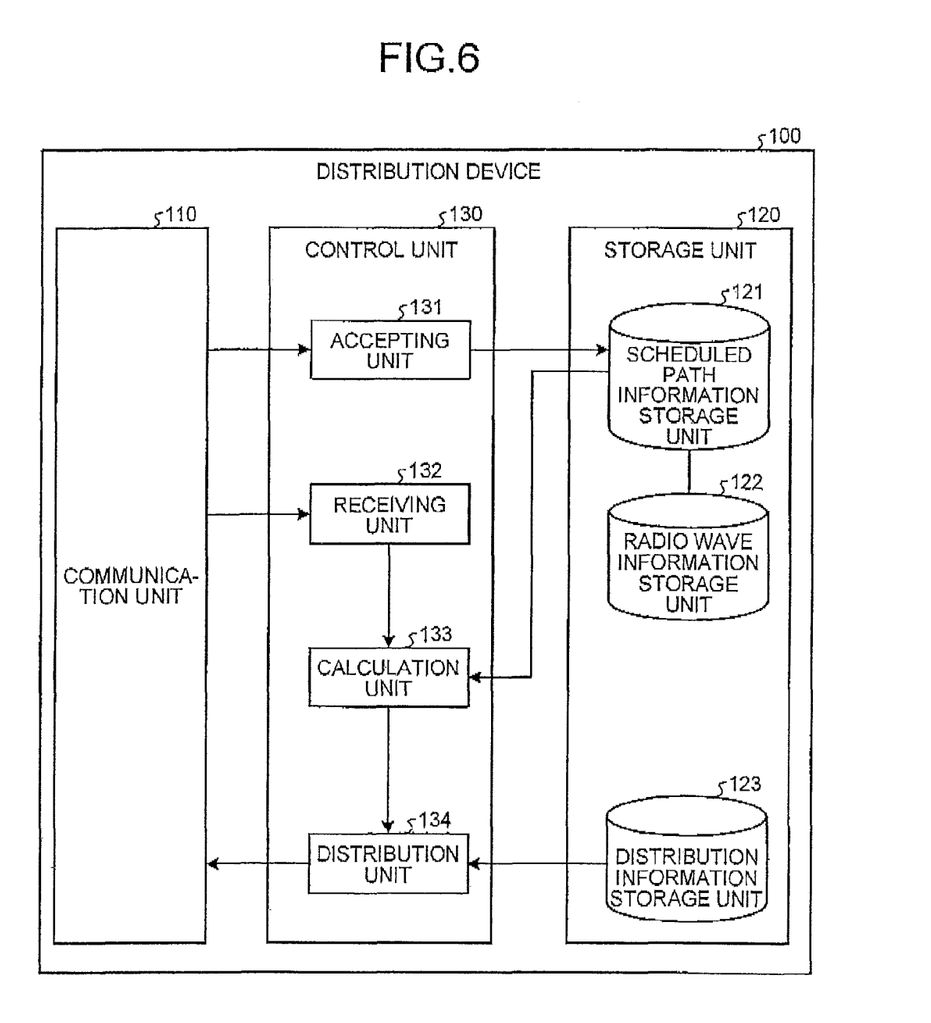
FIG. 6 illustrates a configuration example of a distribution device according to the embodiment.

Next, the configuration of the distribution device 100 according to the embodiment will be described using FIG. 6. FIG. 6 illustrates a configuration example of the distribution device 100 according to the embodiment. As illustrated in FIG. 6, the distribution device 100 includes a communication unit 110, a storage unit 120, and a control unit 130. The distribution device 100 may include an input unit (for example, a keyboard, or a mouse) that accepts various operations from an administrator and the like using the distribution device 100, or a display unit (for example, a liquid crystal display) for displaying various pieces of information.

Communication Unit 110

The communication unit 110 is implemented with the NIC and the like. The communication unit 110 is connected to the network N in a wired or wireless manner, and transmits or receives information to/from the terminal device 10 or the terminal device 20 via the network N.

Storage Unit 120

For example, the storage unit 120 is implemented with a semiconductor memory element such as a RAM or a flash memory, or a storage device such as a hard disk or an optical disk. The storage unit 120 includes a scheduled path information storage unit 121, a radio wave information storage unit 122, and a distribution information storage unit 123.

Scheduled Path Information Storage Unit 121

Figure 7:
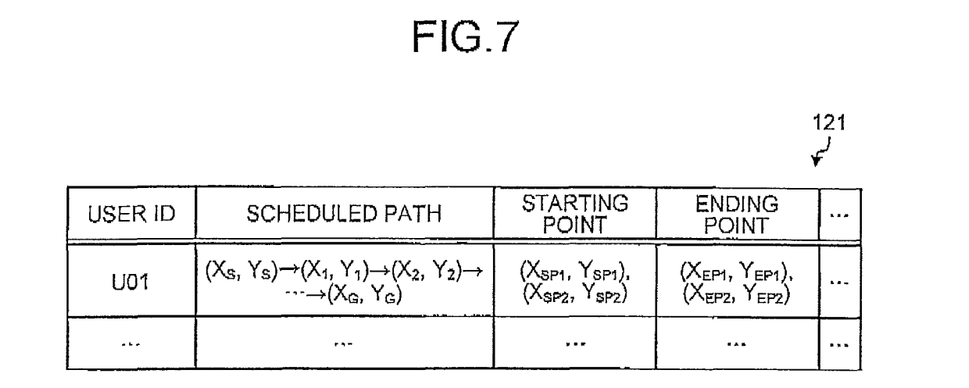
FIG. 7 illustrates an example of the scheduled path information storage unit according to the embodiment.

The scheduled path information storage unit 121 stores therein information about the scheduled path of the user. Specifically, the scheduled path information storage unit 121 stores therein the scheduled path accepted from the terminal device 10. FIG. 7 illustrates an example of the scheduled path information storage unit 121 according to the embodiment. As illustrated in FIG. 7, the scheduled path information storage unit 121 includes items such as "user ID", "scheduled path", "starting point", and "ending point".

The "user ID" indicates identification information for identifying the user. The "scheduled path" indicates change in the GPS coordinates of the scheduled path through which the user passes. The "starting point" indicates the GPS coordinates at a point where a coverage region is switched to an out-of-coverage region. The "ending point" indicates GPS coordinates at a point where an out-of-coverage region is switched to a coverage region. When the scheduled path is accepted from the terminal device 10, the "starting point" and the "ending point" are extracted based on information about coverage region stored in the radio wave information storage unit 122, which will be described later. The "starting point" and the "ending point" may be manually set by the user through the terminal device 10. Alternatively, the "starting point" and the "ending point" may be set by receiving a starting point and an ending point extracted by the terminal device 10.

FIG. 7 illustrates an example in which the scheduled path of the user identified by the user ID "U01" starts from the GPS coordinates $(X_S, Y_S)$ and reaches the GPS coordinates $(X_G, Y_G)$ by way of the GPS coordinates $(X_1, Y_1)$ and $(X_2, Y_2)$ in this order. FIG. 7 illustrates an example of the scheduled path of the user identified by the user ID "U01" in which the coordinates of the starting points are $(X_{SP1}, Y_{SP1})$ and $(X_{SP2}, Y_{SP2})$. FIG. 7 also illustrates an example of the scheduled path of the user identified by the user ID "U01" in which the coordinates of the ending points are $(X_{EP1}, Y_{EP1})$ and $(X_{EP2}, Y_{EP2})$.

Radio Wave Information Storage Unit 122

The radio wave information storage unit 122 stores therein information about a region: For example, the radio wave information storage unit 122 stores therein a coverage region in which the terminal device 10 is communicable. The radio wave information storage unit 122 included in the distribution device 100 holds the same information as that of the radio wave information storage unit 27 included in the terminal device 10, so that detailed description thereof will not be repeated.

Distribution Information Storage Unit 123

Figure 8:
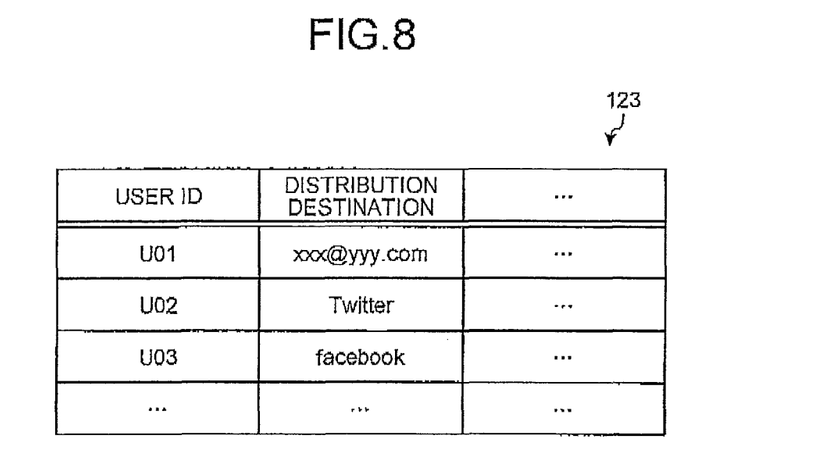
FIG. 8 illustrates an example of a distribution information storage unit according to the embodiment.

The distribution information storage unit 123 stores therein a distribution destination for each user, to which information about the safety of the user is distributed. FIG. 8 illustrates an example of the distribution information storage unit 123 according to the embodiment. As illustrated in FIG. 8, the distribution information storage unit 123 includes items such as "user ID" and "distribution destination".

The "user ID" indicates identification information for identifying the user. The "distribution destination" indicates a distribution destination to which the information about the safety of the user is distributed. For example, email addresses of family who are close to the user or relatives are set to the "distribution destination". An email address of the police who search for a victim may be set to the "distribution destination". A social networking service (SNS) such as Twitter or Facebook, not only an email address, may be set to the "distribution destination". In this case, the safety information is written from an SNS account of the user and thereby distributed.

FIG. 8 illustrates an example in which information about the safety of the user identified by the user ID "U01" is distributed to a distribution destination "xxx@yyy.com". FIG. 8 also indicates that information about the safety of the user identified by the user ID "U02" is written to Twitter.

Control Unit 130

The control unit 130 is implemented by executing various computer programs stored in the storage device in the distribution device 100 using the RAM as a working area with the CPU, the MPU, and the like. At the same time, the control unit 130 is implemented with an integrated circuit such as the ASIC, the FPGA, and the like.

As illustrated in FIG. 6, the control unit 130 includes an accepting unit 131, a receiving unit 132, a calculation unit 133, and a distribution unit 134, and implements or executes functions or effects of the information processing described below. The internal structure of the control unit 130 is not limited to the structure illustrated in FIG. 6, and may be another structure as long as it performs the distribution processing described later. A connection relation among respective processing units included in the control unit 130 is not limited to the connection relation illustrated in FIG. 6, and may be another connection relation.

Accepting Unit 131

The accepting unit 131 accepts the scheduled path from the terminal device 10. For example, the accepting unit 131 accepts GPS coordinates indicating a point, set by the user, through which the user is scheduled to pass from the terminal device 10.

Receiving Unit 132

The receiving unit 132 receives various pieces of information from the terminal device 10. For example, the receiving unit 132 receives location information from the terminal device 10.

Calculation Unit 133

The calculation unit 133 calculates an expected time needed for the user who owns the terminal device 10 to arrive to a predetermined point. Specifically, the calculation unit 133 calculates an expected time needed for the user to arrive from a starting point to the corresponding ending point. For example, the calculation unit 133 calculates an expected time taken from the starting point to the ending point by dividing the distance between the starting point and the ending point by the walking speed of a general user. For example, the walking speed of the user may be measured by the terminal device 10 or may be calculated based on the weight, height, and age of the user. Alternatively, the walking speed of the user may be manually set through the terminal device 10 by the user.

Distribution Unit 134

The distribution unit 134 distributes information about the safety of the user to a predetermined distribution destination. Specifically, the distribution unit 134 distributes information about the safety of the user to the terminal device 20 based on the calculated expected time by the calculation unit 133.

For example, if the location information of the ending point is not received within the expected time calculated by the Calculation unit 133, the distribution unit 134 distributes an alert indicating that the user has lost his/her way to the terminal device 20, which is a distribution destination stored in the distribution information storage unit 123. Because the alert is thus displayed on the terminal device 20, a person concerned who owns the terminal device 20 can find at an early stage that the user has lost his/her way.

If the location information of the ending point is received from the terminal device 10 within the expected time, the distribution unit 134 may distribute a notification indicating that the user has passed through the ending point as scheduled to the terminal device 20. Due to this, a person concerned who owns the terminal device 20 can find that the user arrives as scheduled, so that the person can confirm the safety of the user.

4. Distribution Processing Procedure

Figure 9:
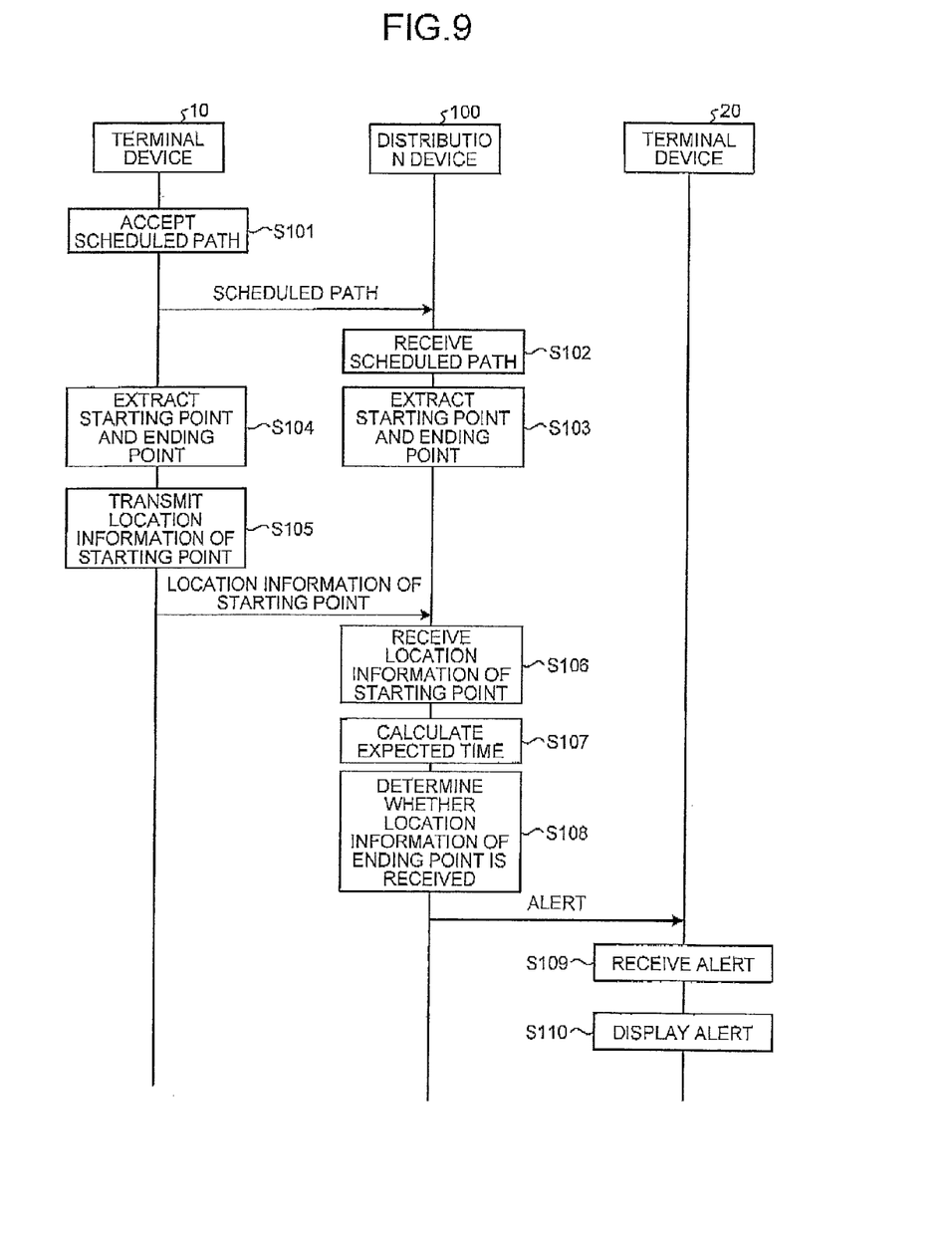
FIG. 9 is a sequence representing a distribution procedure by the distribution device.

Next, processing procedure by the distribution device 100 according to the embodiment will be described using FIG. 9. FIG. 9 is a sequence representing a distribution processing procedure by the distribution device 100 according to the embodiment.

As illustrated in FIG. 9, the terminal device 10 accepts a scheduled path from the user (Step S101). Then the distribution device 100 receives the scheduled path from the terminal device 10 (Step S102).

After that, the distribution device 100 extracts starting points and ending points from the received scheduled path (Step S103). The distribution device 100 may acquire starting points and ending points extracted by the terminal device 10 by receiving them from the terminal device 10. The terminal device 10 extracts the starting points and the ending points from the accepted scheduled path (Step S104). The terminal device 10 may alternatively acquire the starting points and the ending points extracted by the distribution device 100 by receiving them from the distribution device 100.

Thereafter, upon arriving at a starting point, the terminal device 10 transmits the location information of the present location to the distribution device 100 (Step S105). Then the distribution device 100 receives the location information of the starting point from the terminal device 10 (Step S106). The distribution device 100 calculates an expected time taken from the starting point indicated by the received location information to the corresponding ending point (Step S107).

After that, the distribution device 100 determines whether the location information of the ending point is received from the terminal device 10 within the calculated expected time (Step S108). If the location information of the ending point is not received, the distribution device 100 transmits an alert to the terminal device 20. Then the terminal device 20 receives the alert from the distribution device 100 (Step S109). Accordingly, the terminal device 20 causes the display unit to display the alert received in Step S109 (Step S110).

5. Modification

The distribution device 100 according to the embodiment described above may be embodied in various different forms other than the above embodiment. Other embodiments of the distribution device 100 will be described hereinafter.

5-1. Calculation of Expected Time

In the above embodiment, the expected time is calculated by dividing the distance between a starting point and the corresponding ending point by the walking speed of the user. Alternatively, the distribution device 100 described above may calculate the expected time based on the environment of the scheduled path RT or various pieces of information about the characteristics of the user.

Specifically, the calculation unit 133 calculates the expected time with correction according to the environment of the scheduled path from the starting point to the ending point. The distribution device 100 is assumed to store therein information about the temperature, humidity, wind speed, wind direction, weather, obliquity, and a road surface, of the scheduled path. In this case, for example, if the temperature and the humidity of the scheduled path are higher than predetermined threshold values, the calculation unit 133 calculates the expected time to be longer. This is because it is considered that a higher temperature and humidity lead to a larger physical consumption of a general user. For example, if the weather at the path is raining, the calculation unit 133 calculates the expected time to be longer. This is because it is considered that the road surface is slippery when it is raining and a general user takes more time to walk on the surface. For example, if the direction of the wind is opposing and the wind speed is higher than the predetermined threshold value, the calculation unit 133 calculates the expected time to be longer. This is because it is considered that a strong opposing wind lowers the walking speed of a general user.

For example, if the obliquity of the scheduled path is large, the calculation unit 133 calculates the expected time to be longer. This is because it is considered that a larger obliquity of the road surface lowers the walking speed and leads to a larger physical consumption of a general user. For example, if a large percentage of the road surface of the scheduled path is covered with rocks and screen, for example, which are difficult to walk over as compared with dirt, the calculation unit 133 calculates the expected time to be longer.

As described above, the distribution device 100 calculates the expected time with correction according to the environment of the scheduled path, so that the distribution device 100 can calculate the expected time with high accuracy according to the environment of the scheduled path. In this manner, the distribution device 100 can distribute an alert to the terminal device 20 at a timing according to the environment of the scheduled path.

In another example, the calculation unit 133 calculates the expected time with correction according to the characteristics of the user. Specifically, the calculation unit 133 analyzes the characteristics of the user based on the past climbing history of the user, and calculates the expected time with correction according to the analyzed characteristics of the user. The distribution device 100 is assumed to hold the past climbing history of each user.

For example, if it is found from the past climbing history of the user that the walking speed of the user tends to be lower at an uphill road, the calculation unit 133 calculates the expected time to be longer at an uphill path. For example, if the walking speed of the user tends to be higher at a downhill road, the calculation unit 133 calculates the expected time to be shorter at a downhill path. For example, if the walking speed of the user tends to be lower when the obliquity is larger than a predetermined value, the calculation unit 133 calculates the expected time to be longer for a path where the obliquity is larger than the predetermined value.

For example, if the walking speed of the user tends to be lower when the user walks for a predetermined time or more, the calculation unit 133 calculates the expected time to be longer after the predetermined walking time of the user has elapsed.

In another example, the calculation unit 133 calculates the expected time with correction according to the belongings of the user. For example, the calculation unit 133 calculates the expected time to be longer with heavier belongings. This is because it is considered that heavier belongings lower the walking speed of a general user. For example, the calculation unit 133 calculates the expected time to be longer with larger belongings. This is because it is considered that larger belongings make walking difficult and thus lower the walking speed of a general user. For example, if the walking speed of the user tends to be lower when the weight of the belongings is a predetermined value or more, the calculation unit 133 calculates the expected time to be longer when the weight of the belongings of the user is the predetermined value or more.

For example, if a trekking pole is included in the belongings of the user, the calculation unit 133 calculates the expected time with a smaller positive correction amount due to the obliquity. This is because it is considered that the deceleration of the walking speed of a general user on the road surface of which obliquity is high may be reduced when the user uses the trekking pole. For example, the distribution device 100 acquires the information about the belongings of the user by causing the user to input information about the belongings from the terminal device 10.

In another example, the calculation unit 133 calculates the expected time with correction according to a time period in which the user walks. For example, the calculation unit 133 calculates the expected time to be longer in a time period from sunset to sunrise. This is because it is considered that the walking speed of a general user is decelerated when the sun goes down and visibility becomes poor.

In another example, the calculation unit 133 calculates the expected time with correction according to a track record of another user who has walked on the same scheduled path. For example, if another user takes time longer than the expected time to arrive to the ending point, the calculation unit 133 calculates the expected time to be longer. This is because it is considered that an error generated in the walking speed of a general user is similar to that of another user if they walk on the same path.

As described above, the distribution device 100 calculates the expected time with correction according to the characteristics of the user, so that the distribution device 100 can calculate the expected time with high accuracy according to the characteristics of the user. In this manner, the distribution device 100 can distribute an alert to the terminal device 20 at a timing according to the characteristics of the user.

5-2. Distribution of Alert

The above embodiment describes an example in which the distribution device 100 distributes an alert indicating that the user has lost his/her way to the terminal device 20. Alternatively, the distribution device 100 described above may distribute various alerts to the terminal device 20.

Specifically, the distribution device 100 acquires various pieces of information from the terminal device 10. For example, the distribution device 100 acquires the amount of water held by the user from the terminal device 10. The distribution device 100 calculates the amount of water to be consumed based on a required time from the start to the goal, the temperature of the scheduled path, and the humidity of the scheduled path. If the calculated amount of water to be consumed is larger than the held water amount, the distribution device 100 distributes an alert indicating shortage of water to the terminal device 10. Accordingly, the alert is displayed on the terminal device 10.

As described above, the distribution device 100 distributes the alert to the terminal device 10, so that the user can recognize that he/she needs to get water.

The above processing is not limited to a case in which the distribution device 100 calculates the amount of water to be consumed to distribute the alert. Alternatively, if the terminal device 10 calculates the amount of water to be consumed to be larger than the held water amount, the alert may be displayed on the terminal device 10.

5-3. Setting of Buffer

In the above embodiment, the distribution device 100 calculates the expected time. The distribution device 100 described above may add a buffer, accepted as an error, to the expected time.

For example, the distribution device 100 calculates, as the buffer, the mean value of errors between the expected time and an actual required time in the past climbing history of the user. Then, if the location information of the ending point is not received within a time obtained by adding the buffer to the expected time, the distribution device 100 distributes an alert to the terminal device 20.

The distribution device 100 may correct the buffer according to various situations. For example, if the user walks not along the scheduled path, the distribution device 100 searches for paths by which the user can return to the ending point from a point where the user has deviated from the scheduled path. Subsequently, the distribution device 100 calculates the longest time required for the user to arrive to the ending point along the searched paths. Then the distribution device 100 calculates a difference between the calculated required time and the expected time as a buffer.

The distribution device 100 may correct the buffer based on a change in the weather. For example, the distribution device 100 corrects the buffer to be longer if the weather changes from sunny to raining. For example, the distribution device 100 corrects the buffer to be longer if the temperature rises or falls abruptly. For example, the distribution device 100 corrects the buffer to be longer if the wind speed increases abruptly.

The distribution device 100 may correct the buffer based on the track record of the user up to the starting point. For example, if the walking speed of the user up to the starting point is higher than the mean value of the walking speed of the user, the distribution device 100 corrects the buffer to be shorter. For example, if an elapsed time up to the starting point is shorter than expected, the distribution device 100 corrects the buffer to be shorter.

As described above, the distribution device 100 sets the buffer, so that the distribution device 100 can distribute an alert to the terminal device 20 at a timing according to the current situation.

5-4. Estimate Present Position of User

In the above embodiment, the distribution device 100 distributes an alert to the terminal device 10. Alternatively, the distribution device 100 may estimate the present position of the user. Specifically, the distribution device 100 estimates the present position of the user in an out-of-coverage region based on location information received by the receiving unit 132. For example, the distribution device 100 estimates the present position of the user by calculating a range in which the user can move from a position indicated by the received location information using the received location information, time when the location information is received, and the walking speed of the user.

If the location information of the ending point is not received within the expected time, the distribution device 100 distributes the estimated present position to the terminal device 20. Accordingly, the owner of the terminal device 20 can recognize the present position of the user, so that the user can be discovered at an early stage.

6. Others

Among the processes described in the above embodiments, all or part of the processes described as automatically performed may be manually performed, or all or part of the processes described as manually performed may be automatically performed using a known method. Information including the processing procedures, the specific names, and the various pieces of data or parameters described above or illustrated in the drawings may be optionally modified unless specifically described.

The components of the devices in the drawings are conceptually illustrated as functionalities, and not necessary to be physically configured as illustrated in the drawings. That is, a specific form of distribution or integration of the devices is not limited as illustrated in the drawings. Alternatively, all or part of the devices may be functionally or physically distributed or integrated by arbitrary units according to various loads or use situations.

For example, the radio wave information storage unit 122 illustrated in FIG. 6 may be held by a storage server and the like, not by the distribution device 100. In this case, the distribution device 100 acquires information about radio waves in each region by accessing the storage server.

The distribution device 100 may also be a calculation device that does not perform the distribution process of alerts and performs only a calculation process by the calculation unit 133. In this case, the calculation device does not include at least the distribution unit 134. The distribution device including the distribution unit 134 distributes alerts to the terminal device 10 and the like.

Figure 10:
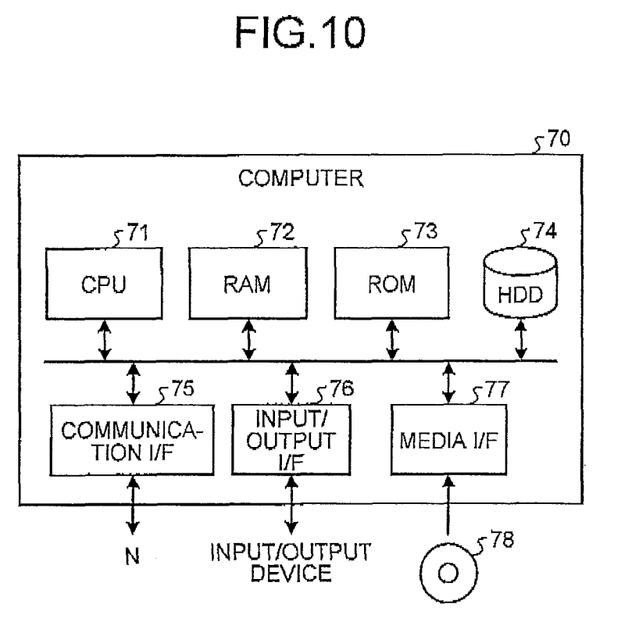
FIG. 10 is a hardware configuration diagram illustrating an example of a computer that implements the function of the distribution device.

For example, the distribution device 100 according to the above embodiment is implemented with a computer 70 having a configuration as illustrated in FIG. 10. FIG. 10 is a hardware configuration diagram illustrating an example of the computer 70 that implements the function of the distribution device 100. The computer 70 includes a CPU 71, a RAM 72, a read only memory (ROM) 73, a hard disk drive (HDD) 74, a communication interface (I/F) 75, an input/output interface (I/F) 76, and a media interface (I/F) 77.

The CPU 71 operates based on a computer program stored in the ROM 73 or the HDD 74, and controls each component. The ROM 73 stores therein a boot program executed by the CPU 71 when the computer 70 is launched, a computer program depending on the hardware of the computer 70, and the like.

The HDD 74 stores therein a computer program executed by the CPU 71, data used by the program, and the like. The communication interface 75 receives data from other equipment via the network N, transmits the received data to the CPU 71, and transmits data generated by the CPU 71 to the other equipment via the network N.

The CPU 71 controls an output device such as a display or a printer, and an input device such as a keyboard or a mouse, via the input/output interface 76. The CPU 71 acquires data from the input device via the input/output interface 76. The CPU 71 outputs generated data to the output device via the input/output interface 76.

The media interface 77 reads out a computer program or data stored in a recording medium 78 and provides the program or the data to the CPU 71 via the RAM 72. The CPU 71 loads the program on the RAM 72 from the recording medium 78 via the media interface 77, and executes the loaded program. For example, the recording medium 78 is an optical recording medium such as a digital versatile disc (DVD) and a phase change rewritable disk (PD), magneto-optical recording medium such as a magneto-optical disk (MO), a tape medium, a magnetic recording medium, and a semiconductor memory.

When the computer 70 functions as the distribution device 100 according to the embodiment, the CPU 71 of the computer 70 implements the functions of the receiving unit 132, the calculation unit 133, and the distribution unit 134 by executing computer programs loaded on the RAM 72. The HDD 74 stores therein pieces of data in the scheduled path information storage unit 121, the radio wave information storage unit 122, and the distribution information storage unit 123.

The CPU 71 of the computer 70 reads out the programs from the recording medium 78 and executes the programs. Alternatively, the CPU 71 may acquire these programs from another device via the network N.

7. Effects

As described above, the distribution device 100 according to the embodiment includes the receiving unit 132, the calculation unit 133, and the distribution unit 134. The receiving unit 132 receives location information from a terminal device owned by a user. When the receiving unit 132 receives the location information of a starting point (corresponding to an example of a first coverage region), the calculation unit 133 calculates an expected time within which the user arrives from the starting point by way of an out-of-coverage region in which communication cannot be performed to the corresponding ending point (corresponding to an example of a second coverage region). If the location information of the ending point is not received from the terminal device within the expected time calculated by the calculation unit 133, the distribution unit 134 distributes an alert to the terminal device 20 (corresponding to an example of a predetermined distribution destination).

Accordingly, the distribution device 100 according to the embodiment can find at an early stage that the user has lost his/her way. The owner of the terminal device 20 can confirm the safety of the user even if the terminal device 10 is in the out-of-coverage region.

In the distribution device 100 according to the embodiment, the accepting unit 131 accepts a scheduled path from the terminal device. The calculation unit 133 calculates the expected time within which the user arrives from the starting point to the ending point along the scheduled path accepted by the accepting unit 131.

Accordingly, the distribution device 100 according to the embodiment can calculate a time needed for the user to walk on a path in the out-of-coverage region.

In the distribution device 100 according to the embodiment, the receiving unit 132 receives location information and information about the characteristics of the user from the terminal device. The calculation unit 133 calculates the expected time based on the location information and the information about the characteristics of the user received by the receiving unit 132.

Accordingly, the distribution device 100 according to the embodiment can calculate the expected time with high accuracy according to the characteristics of the user. Due to this, the distribution device 100 can distribute an alert to the terminal device 20 at a timing according to the characteristics of the user.

In the distribution device 100 according to the embodiment, the receiving unit 132 receives location information and information about the environment of the scheduled path from the terminal device. The calculation unit 133 calculates the expected time based on the location information and the information about the environment of the scheduled path received by the receiving unit 132.

Accordingly, the distribution device 100 can calculate the expected time with high accuracy according to the environment of the scheduled path. Due to this, the distribution device 100 can distribute an alert to the terminal device 20 at a timing according to the environment of the scheduled path.

The distribution device 100 according to the embodiment estimates the present position of the user in the out-of-coverage region based on the location information received by the receiving unit 132. If the location information of the ending point is not received from the terminal device 10 within the expected time, the distribution device 100 distributes the estimated present location of the user to the terminal device 20.

Accordingly, the distribution device 100 can estimate the present position of the user, so that the user can be discovered at an early stage.

In the distribution device 100 according to the embodiment, if the location information of the ending point is received from the terminal device 10 within the expected time, the distribution unit 134 distributes a notification indicating that the user is arriving as scheduled to the terminal device 20.

Accordingly, the distribution device 100 can notify a person concerned who owns the terminal device 20 that the user is arriving as scheduled, so that the person concerned can confirm the safety of the user.

In the distribution device 100 according to the embodiment, the receiving unit 132 receives the location information, the information about the characteristics of the user, or the information about the environment of the scheduled path, from the terminal device 10. The distribution unit 134 sets a buffer based on the location information, the information about the characteristics of the user, or the information about the environment of the scheduled path received by the receiving unit 132. If the location information of the ending point is not received from the terminal device 10 within a time obtained by adding the set buffer to the expected time, the distribution unit 134 distributes an alert to the terminal device 20.

Accordingly, the distribution device 100 adds the buffer to the expected time, so that the distribution device 100 can distribute the alert to the terminal device 20 at a timing according to the current situation.

The terminal device 10 according to the embodiment includes the acquisition unit 24 and the transmission unit 32. The acquisition unit 24 acquires the location information about the present location. The transmission unit 32 transmits the location information acquired by the acquisition unit 24 to the distribution device 100 including the receiving unit 132, the calculation unit 133, and the distribution unit 134. The receiving unit 132 receives the location information. When the receiving unit 132 receives the location information, the calculation unit 133 calculates the expected time needed for the user to arrive from the starting point by way of the out-of-coverage region in which the communication cannot be performed to the ending point. The distribution unit 134 distributes an alert to the terminal device 20 if the location information of the ending point is not received from the terminal device 10 within the expected time calculated by the calculation unit 133.

Accordingly, if the user cannot arrive at the ending point within the expected time, the terminal device 10 can cause the distribution device 100 to transmit an alert to the terminal device 20. Therefore, the owner of the terminal device 20 can confirm the safety of the user.

Hereinabove, although some embodiments of the present application have been described in detail based on the drawings, the embodiments are exemplary only. Alternatively, the present invention may be implemented in other forms by variously changing and modifying the modes described herein based on knowledge of those skilled in the art.

The distribution device 100 described above may be implemented with a plurality of server computers, or implemented by calling an external platform and the like through an application programming interface (API) or network computing depending on functions. Thus, the configuration thereof may be flexibly changed.

Terms such as "section", "module", "unit" described in claims may be replaced with "means" or "circuit". For example, the receiving unit may be replaced with receiving means or a receiving circuit.

An aspect of the embodiments can exert an effect that the safety of the user can be confirmed even in an out-of-coverage region.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A distribution device comprising a processor configured to:
receive location information and a scheduled path, which starts from a first coverage region in which communication is possible and reaches a second coverage region in which communication is possible by way of an out-of-coverage region in which communication is impossible, from a first terminal device possessed by a user;
when the location information and the scheduled path is received, calculate an expected time within which the user arrives to the second coverage region from the first coverage region by way of the out-of-coverage region;
correct the expected time based on a user property including one of: ability, physical characteristics, and material possessions of the user; and
distribute an alert to a second terminal device when the location information of the second coverage region is not received from the first terminal device within the corrected expected time.

2. The distribution device according to claim 1, wherein the processor is further configured to:
calculate the expected time taken for arriving from a point where the first coverage region is switched to the out-of-coverage region to a point where the out-of-coverage region is switched to the second coverage region along the scheduled path.

3. The distribution device according to claim 1, wherein the processor is further configured to:
receive the user property from the first terminal device.

4. The distribution device according to claim 2, wherein the processor is further configured to:
receive the user property from the first terminal device.

5. The distribution device according to claim 1, wherein the processor is further configured to:
receive information about an environment of the scheduled path from the first terminal device; and
calculate the expected time based on the received location information and information about the environment of the scheduled path.

6. The distribution device according to claim 2, wherein the processor is further configured to:
receive information about an environment of the scheduled path from the first terminal device; and
calculate the expected time based on the received location information and information about the environment of the scheduled path.

7. The distribution device according to claim 1, wherein the processor is further configured to:

estimate a present position of the user in the out-of-coverage region based on the received location information; and distribute the estimated present position of the user to the second terminal device when the location information of the second coverage region is not received from the first terminal device within the expected time.

8. The distribution device according to claim 2, wherein the processor is further configured to:

estimate a present position of the user in the out-of-coverage region based on the received location information; and distribute the estimated present position of the user to the second terminal device when the location information of the second coverage region is not received from the first terminal device within the expected time.

9. The distribution device according to claim 1, wherein the processor is further configured to:

distribute a notification indicating that the user is arriving as scheduled to the second terminal device when the location information of the second coverage region is received from the first terminal device within the expected time.

10. The distribution device according to claim 2, wherein the processor is further configured to:

distribute a notification indicating that the user is arriving as scheduled to the second terminal device when the location information of the second coverage region is received from the first terminal device within the expected time.

11. The distribution device according to claim 1, wherein the processor is further configured to:

receive the user property or information about an environment of the scheduled path from the first terminal device;

set a buffer based on the received location information, user property, or information about the environment of the scheduled path; and distribute an alert to the second terminal device when the location information of the second coverage region is not received from the first terminal device within a time obtained by adding the set buffer to the expected time.

12. The distribution device according to claim 2, wherein the processor is further configured to:

receive the user property or information about an environment of the scheduled path from the first terminal device;

set a buffer based on the received location information, user property, or information about the environment of the scheduled path; and distribute an alert to the second terminal device when the location information of the second coverage region is not received from the first terminal device within a time obtained by adding the set buffer to the expected time.

13. A distribution method comprising, by a distribution device:

receiving location information and a scheduled path, which starts from a first coverage region in which communication is possible and reaches a second coverage region in which communication is possible by way of an out-of-coverage region in which communication is impossible, from a first terminal device possessed by a user;

calculating, when the location information is received, an expected time within which the user arrives to the second coverage region from the first coverage region by way of the out-of-coverage region;

correcting the expected time based on a user property including one of: ability, physical characteristics, and material possessions of the user; and distributing an alert to a second terminal device when the location information of the second coverage region is not received from the first terminal device within the corrected expected time.

14. The distribution method according to claim 13, wherein at the calculating of the expected time, an expected time is calculated for arriving from a point where the first coverage region is switched to the out-of-coverage region to a point where the out-of-coverage region is switched to the second coverage region along the scheduled path.

15. A first terminal device comprising:

a locator configured to acquire location information about a present location; and a transmitter configured to transmit the acquired location information to a distribution device, the distribution device including a processor configured to:

receive the location information and a scheduled path, which starts from a first coverage region in which communication is possible and reaches a second coverage region in which communication is possible by way of an out-of-coverage region in which communication is impossible;

calculate, when the location information is received, an expected time within which a user arrives to the second coverage region from the first coverage region by way of the out-of-coverage region;

correct the expected time based on a user property including one of: ability, physical characteristics, and material possessions of the user; and distribute an alert to a second terminal device when the location information of the second coverage region is not received from the first terminal device within the corrected expected time.

* * * * *